United States Patent
Kato et al.

(10) Patent No.: US 12,522,056 B2
(45) Date of Patent: Jan. 13, 2026

(54) VEHICLE DOOR BEAM

(71) Applicant: Honda Motor Co., Ltd., Tokyo (JP)

(72) Inventors: Nobuaki Kato, Tokyo (JP); Taku Nagahama, Tokyo (JP); Ryo Onaka, Tokyo (JP); Ryosuke Tetsuka, Tokyo (JP); Naoki Katsumata, Tokyo (JP); Shohei Ohtsuka, Tochigi (JP); Jiah Choi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 343 days.

(21) Appl. No.: 18/169,209

(22) Filed: Feb. 15, 2023

(65) Prior Publication Data
US 2023/0286359 A1    Sep. 14, 2023

(30) Foreign Application Priority Data
Mar. 10, 2022    (CN) .......................... 202210236757.5

(51) Int. Cl.
*B60J 5/04* (2006.01)

(52) U.S. Cl.
CPC .......... *B60J 5/0423* (2013.01); *B60J 5/0425* (2013.01); *B60J 5/0437* (2013.01); *B60J 5/0443* (2013.01); *B60J 5/0447* (2013.01); *B60J 5/0413* (2013.01)

(58) Field of Classification Search
CPC ...... B60J 5/0423; B60J 5/0413; B60J 5/0425; B60J 5/0447; B60J 5/0437
USPC .................. 296/146.6, 146.5, 193.06, 187.12
See application file for complete search history.

(56) References Cited

U.S. PATENT DOCUMENTS

| | | | | |
|---|---|---|---|---|
| 6,382,707 B1* | 5/2002 | Dunneback | ............ | B60J 5/0425 296/187.12 |
| 6,754,991 B2* | 6/2004 | Tokui | ..................... | B60J 5/0416 49/502 |
| 7,441,826 B2* | 10/2008 | Frank | ..................... | B60J 5/0447 296/187.12 |
| 8,444,208 B2* | 5/2013 | Inoue | ..................... | B60J 5/0443 296/146.6 |
| 8,727,421 B2* | 5/2014 | Cohoon | ................ | B60J 5/0444 296/146.6 |
| 9,487,066 B1* | 11/2016 | Hansen | ................. | B60J 5/0461 |
| 2014/0062132 A1 | 3/2014 | Schleichert | | |

(Continued)

FOREIGN PATENT DOCUMENTS

| | | | |
|---|---|---|---|
| JP | 3029724 B2 | * | 4/2000 |
| JP | 2004345507 A | * | 12/2004 |

(Continued)

OTHER PUBLICATIONS

Translation JP3019724.*

(Continued)

*Primary Examiner* — Amy R Weisberg
*Assistant Examiner* — Denise Lynne Esquivel
(74) *Attorney, Agent, or Firm* — JCIPRNET (57) ABSTRACT

A vehicle door beam is disclosed. The vehicle door beam includes: a beam body extending along a front-rear direction of the vehicle; and an inner side member disposed at a vehicle inner side of the beam body. The inner side member includes: a fixing part fixed to the beam body; and a non-fixing part not fixed to the beam body and being disposed at a position in front of the fixing part in the front-rear direction.

13 Claims, 5 Drawing Sheets

(56) References Cited

U.S. PATENT DOCUMENTS

2018/0111452 A1* 4/2018 Deng .................... B60J 5/0429
2019/0193532 A1* 6/2019 Mori .................... B60J 5/0437

FOREIGN PATENT DOCUMENTS

JP          4188141      11/2008
JP          7595557 B2 * 12/2024

OTHER PUBLICATIONS

Translation JP2004345507.*
"Office Action of China Counterpart Application", issued on Sep. 11, 2025, with English translation thereof, pp. 1-15.

* cited by examiner

VEHICLE DOOR BEAM

CROSS-REFERENCE TO RELATED APPLICATION

This application claims the priority benefit of Chinese application no. 202210236757.5, filed on Mar. 10, 2022. The entirety of the above-mentioned patent application is hereby incorporated by reference herein and made a part of this specification.

BACKGROUND

Technical Field

The disclosure relates to a vehicle door beam. Particularly, the disclosure relates to a vehicle door beam disposed at a door of a vehicle.

Description of Related Art

In recent years, construction of safe cities and human settlements has been strengthened in all countries to strengthen inclusive and sustainable urban development, sustainable human settlements planning, and management capacity in all countries. Accordingly, it is necessary to strengthen the provision of safe, affordable, accessible, and sustainable transportation systems to all people in all countries; it is necessary to improve road safety, particularly expansion of public transport; and it is necessary to pay special attention to the needs of persons in vulnerable situations, women, children, persons with disabilities, and the elderly. In the field of transportation, there is an urgent need to take measures to address environmental issues to develop technologies that can improve the convenience and safety of public transportation.

In the manufacturing industry of conventional vehicles, a door structure for use in a vehicle has been disclosed, in which a vehicle door beam is disposed between an outer panel at a vehicle door outer side and an inner panel at a vehicle door inner side, and the vehicle door beam provides reinforcement against impact on the vehicle door from a lateral direction.

For example, Patent Document 1 (Japanese Patent Publication No. 4188141) discloses a vehicle door reinforcement structure that reduces deformation of a vehicle door panel when the vehicle withstands side impact. In Patent Document 1, when viewed in a vehicle width direction, a front end of a vehicle door beam (74 in FIG. 3 in Patent Document 1) is disposed intersecting a front window sash (50 in FIG. 3 in Patent Document 1) and not intersecting a front pillar (7 in FIG. 3 in Patent Document 1), and a rear end of the vehicle door beam is disposed intersecting a center pillar (9 in FIG. 3 in Patent Document 1). Patent Document 1 discloses a technology as follows: by disposing the vehicle door beam, when the vehicle is under side impact, taking the position where the rear end of the vehicle door beam is in contact with the center pillar as a fulcrum, the front portion of the vehicle door beam may move toward the front window sash.

Accordingly, the vehicle door beam in the convention (e.g., in Patent Document 1) is so disposed that the front end thereof intersects the front window sash but not the front pillar. However, in such an arrangement, when the vehicle is under side impact, the vehicle door beam deforms in such a manner that the front portion of the beam body moves toward the front window sash. As a result, there is an issue in the convention as follows: when the vehicle door beam deforms under an impact force, the portion that moves at a vehicle inner side is limited to the position of the front window sash, so the deformed position of the vehicle door beam is limited by the position of the front window sash.

SUMMARY

Disclosed is a vehicle door beam disposed at a vehicle door of a vehicle, the vehicle door beam including: a beam body extending along a front-rear direction of the vehicle; and an inner side member disposed at a vehicle inner side of the beam body. The inner side member includes: a fixing part fixed to the beam body; and a non-fixing part not fixed to the beam body and being disposed at a position in front of the fixing part in the front-rear direction.

DESCRIPTION OF THE EMBODIMENTS

The disclosure provides a vehicle door beam, in which a non-fixing part of the vehicle door beam corresponding to a knee position of a passenger in the vehicle is displaced toward a vehicle inner side when the vehicle door beam deforms under side impact. Accordingly, impact on the thigh can be alleviated to prevent damage to lower limbs of the passenger in the vehicle, improving safety.

Disclosed is a vehicle door beam disposed at a vehicle door of a vehicle, the vehicle door beam including: a beam body extending along a front-rear direction of the vehicle; and an inner side member disposed at a vehicle inner side of the beam body. The inner side member includes: a fixing part fixed to the beam body; and a non-fixing part not fixed to the beam body and being disposed at a position in front of the fixing part in the front-rear direction.

In this way, when the vehicle door beam deforms under side impact, the non-fixing part may be displaced in such a manner that the non-fixing part moves away from the beam body toward the vehicle inner side as the fixing part deforms along the beam body. Accordingly, impact on the thigh can be alleviated to prevent damage to lower limbs of the passenger in the vehicle, improving safety.

In an embodiment of the disclosure, the non-fixing part is disposed to be continuous with the fixing part.

In this way, when deformation is generated under an impact force, the fixing part consistently follows and deforms with the beam body, and the non-fixing part continuous with the fixing part is reliably separated from the beam body and displaced toward the vehicle inner side.

In an embodiment of the disclosure, the vehicle door beam further includes: an outer side member disposed at a vehicle outer side of the beam body. The beam body is located between the inner side member and the outer side member in a width direction of the vehicle. The inner side member is provided with a joining surface extending along the front-rear direction and joined with the outer side member, and the non-fixing part is disposed to be continuous with the joining surface.

In this way, when deformation is generated under an impact force, the non-fixing part can be reliably separated from the beam body and displaced toward the vehicle inner side.

In an embodiment of the disclosure, the inner side member is formed with a recess part accommodating a portion of the beam body and a flange part disposed on at least one of an upper side and a lower side of the recess part, and the joining surface and the non-fixing part are disposed at the flange part.

In this way, when deformation is generated under an impact force, the non-fixing part can be reliably separated from the beam body and displaced toward the vehicle inner side.

In an embodiment of the disclosure, the non-fixing part is disposed to extend across the flange part and the recess part.

In this way, when the non-fixing part relatively reliably pushes the corresponding specific part (e.g., the knee or the like) of the passenger toward the vehicle inner side under impact, deformation of the non-fixing part can be suppressed.

In an embodiment of the disclosure, the vehicle door includes a vehicle door inner panel located at the vehicle inner side of the beam body. The vehicle door inner panel is formed with an opening part. The non-fixing part is disposed at a position overlapped with the opening part when viewed in a vehicle width direction.

In this way, when the vehicle door beam deforms under impact, the non-fixing part can relatively reliably push the knee of the passenger toward the vehicle inner side.

In an embodiment of the disclosure, the beam body includes a front side intersection point intersecting a front pillar of the vehicle in a vehicle width direction and a rear side intersection point intersecting a center pillar of the vehicle in the vehicle width direction. The non-fixing part is disposed at a position in front of a middle position between the front side intersection point and the rear side intersection point.

In this way, the non-fixing part can relatively reliably push the knee of the passenger toward the vehicle inner side.

In an embodiment of the disclosure, the beam body includes an innermost point located at an innermost side in a vehicle width direction when side protrusion occurs due to deformation. The non-fixing part is disposed at a position in front of the innermost point.

In this way, the non-fixing part can relatively reliably push the knee of the passenger toward the vehicle inner side.

Based on the foregoing, in the vehicle door beam of the disclosure, since the non-fixing part is disposed at a position of the vehicle door beam corresponding to the knee of the passenger, when the vehicle door beam deforms under side impact, the non-fixing part may be displaced in such a manner that the non-fixing part moves away from the beam body toward the vehicle inner side as the fixing part deforms along the beam body. Since the non-fixing part is disposed at a position of the vehicle door beam corresponding to the knee of the passenger in the vehicle, the non-fixing part pushes, for example, the knee of the passenger (spaced by a door trim panel or the like in between) toward the vehicle inner side. Accordingly, impact on the thigh can be alleviated to prevent damage to lower limbs of the passenger in the vehicle, improving safety.

To make the aforementioned more comprehensible, several embodiments accompanied with drawings are described in detail as follows.

Hereinafter, the embodiments of the disclosure will be described with reference to the drawings. In the embodiments described below, the scope of the disclosure is not necessarily limited to the number, amount, or the like being referred to unless otherwise specified. In addition, in the embodiments below, each constituent element is not necessarily requisite for the disclosure unless otherwise specified. Furthermore, in the case where multiple embodiments are present below, it is originally intended that the featuring parts of the embodiments are combinable with each other as appropriate unless otherwise specified.

A vehicle door beam including the disclosed embodiments will be described with reference to the drawings. In the drawings, X represents a front direction of a front-rear direction of the vehicle, Z represents an up direction of an up-down direction of the vehicle, and Y represents an inner direction of a width direction of the vehicle (a vehicle width direction). In addition, the directions and positions in the description of the disclosure are defined on the premise that the front of the vehicle faces forward. Hereinafter, embodiments of the disclosure related to a vehicle door beam disposed at a door of a vehicle are provided for detailed description with reference to the drawings.

Figure 1:
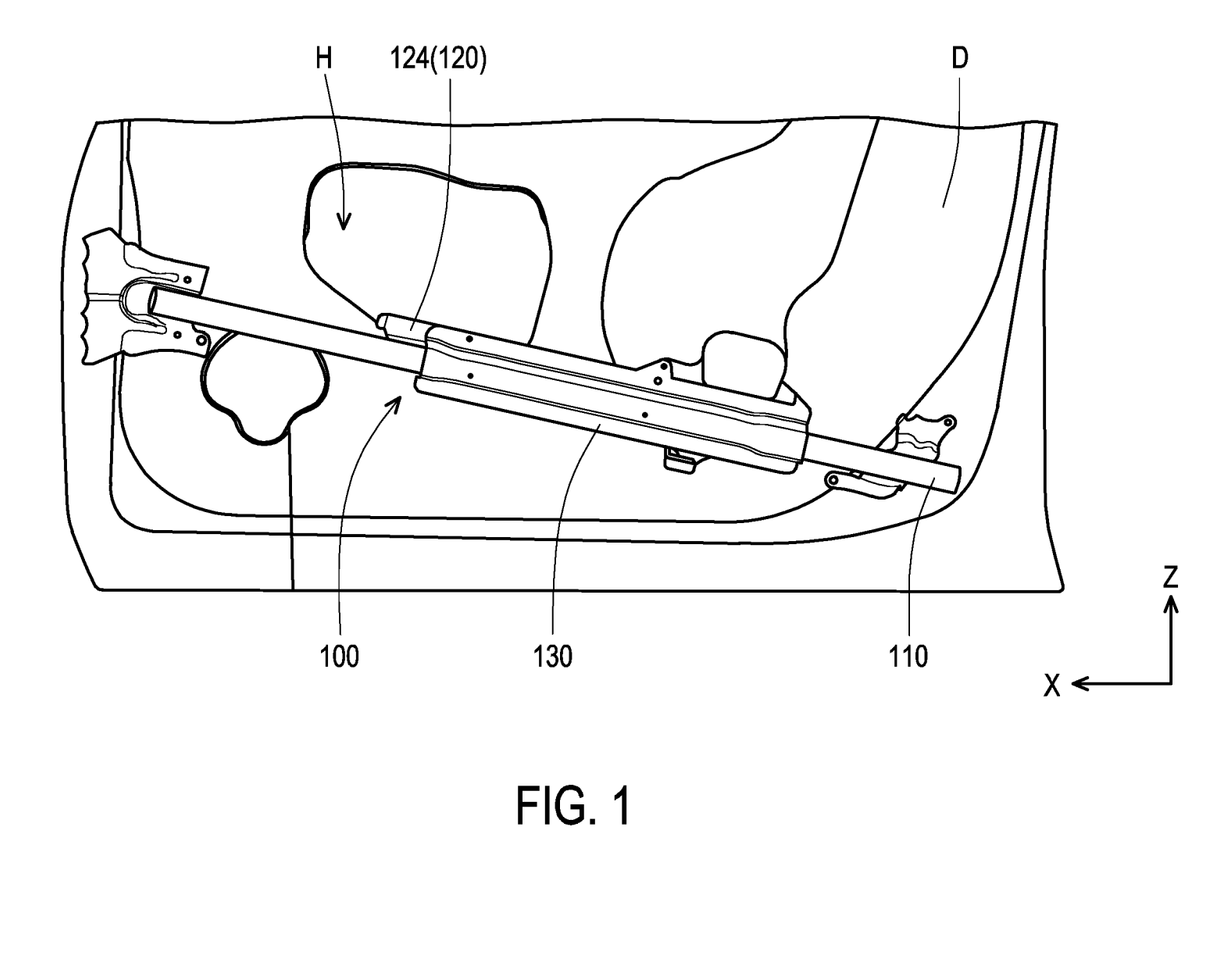
FIG. 1 is a schematic view schematically showing a vehicle door beam disposed at a vehicle door according to an embodiment of the disclosure.
Figure 2:
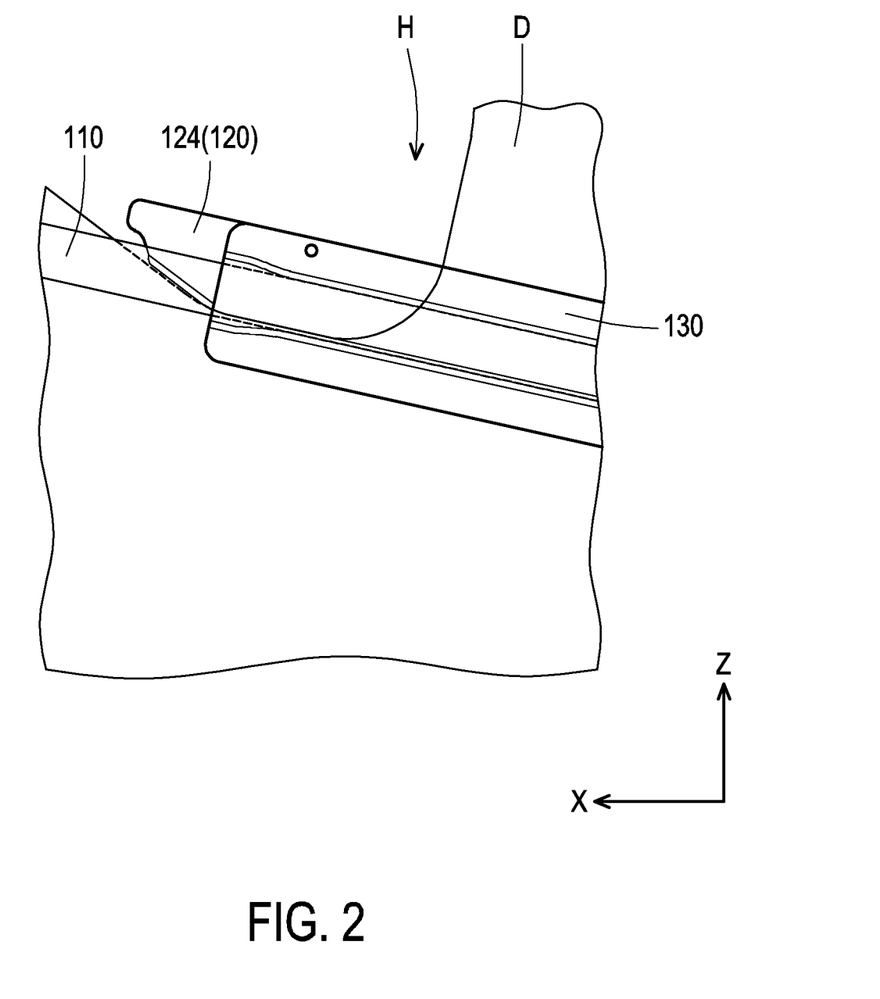
FIG. 2 is a partially enlarged view of FIG. 1.

FIG. 1 is a schematic view schematically showing a vehicle door beam disposed at a vehicle door according to an embodiment of the disclosure. FIG. 1 partially shows the vehicle door beam disposed at the vehicle door and omits other members of the vehicle door, and FIG. 1 is a schematic view of the vehicle door beam viewed from a vehicle outer side. FIG. 2 is a partially enlarged view of FIG. 1. With reference to FIG. 1 and FIG. 2, the vehicle door beam 1 of the disclosure may be mounted at the vehicle door of the vehicle. In addition, in this embodiment, the vehicle door at the left side (front left side or rear left side) of the vehicle is taken as an example for description. Nonetheless, the vehicle door beam of the disclosure may also be disposed at any vehicle door of a vehicle, and the disclosure is not limited thereto.

Figure 3:
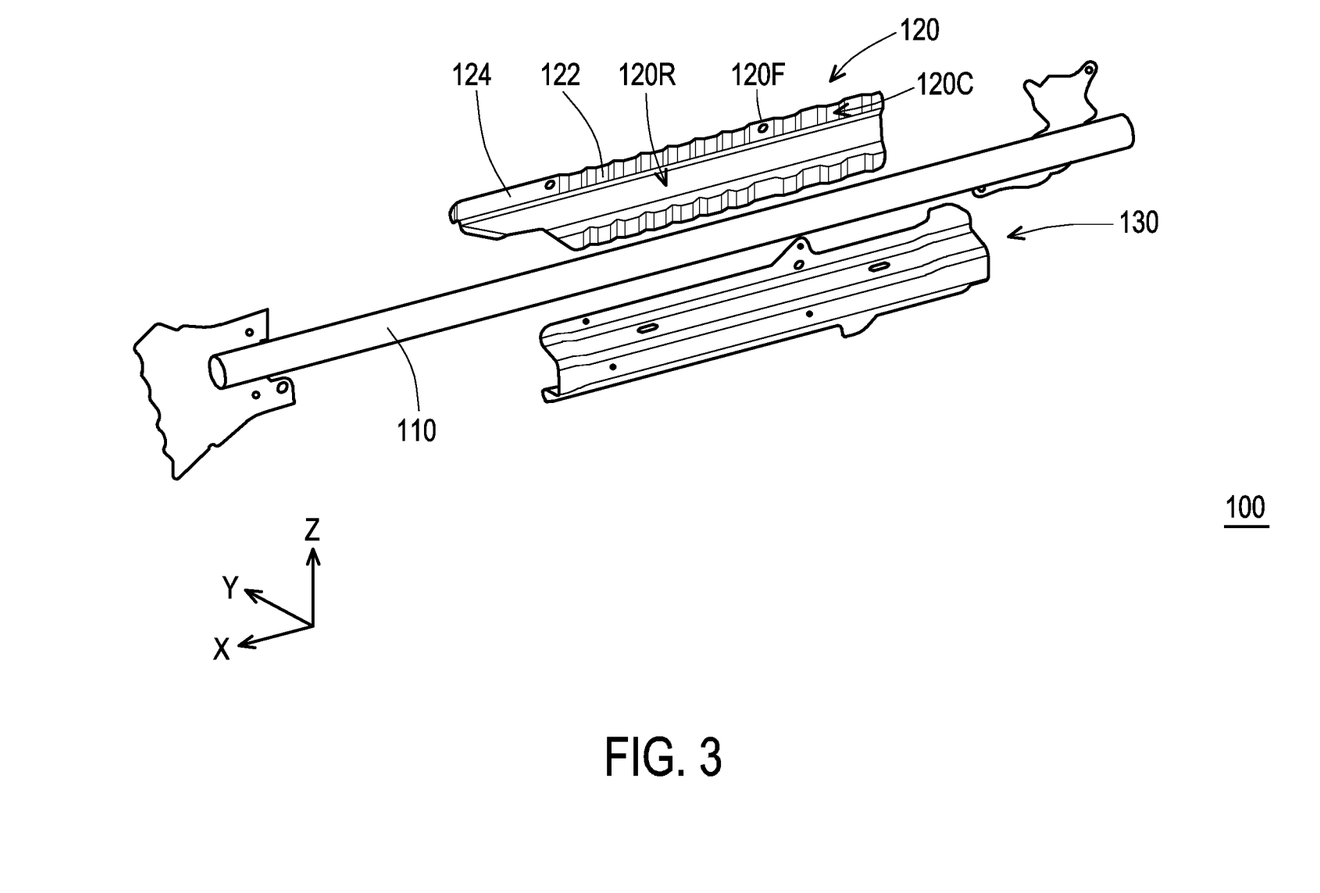
FIG. 3 schematically shows a vehicle door beam of FIG. 1 according to an embodiment of the disclosure.
Figure 4:
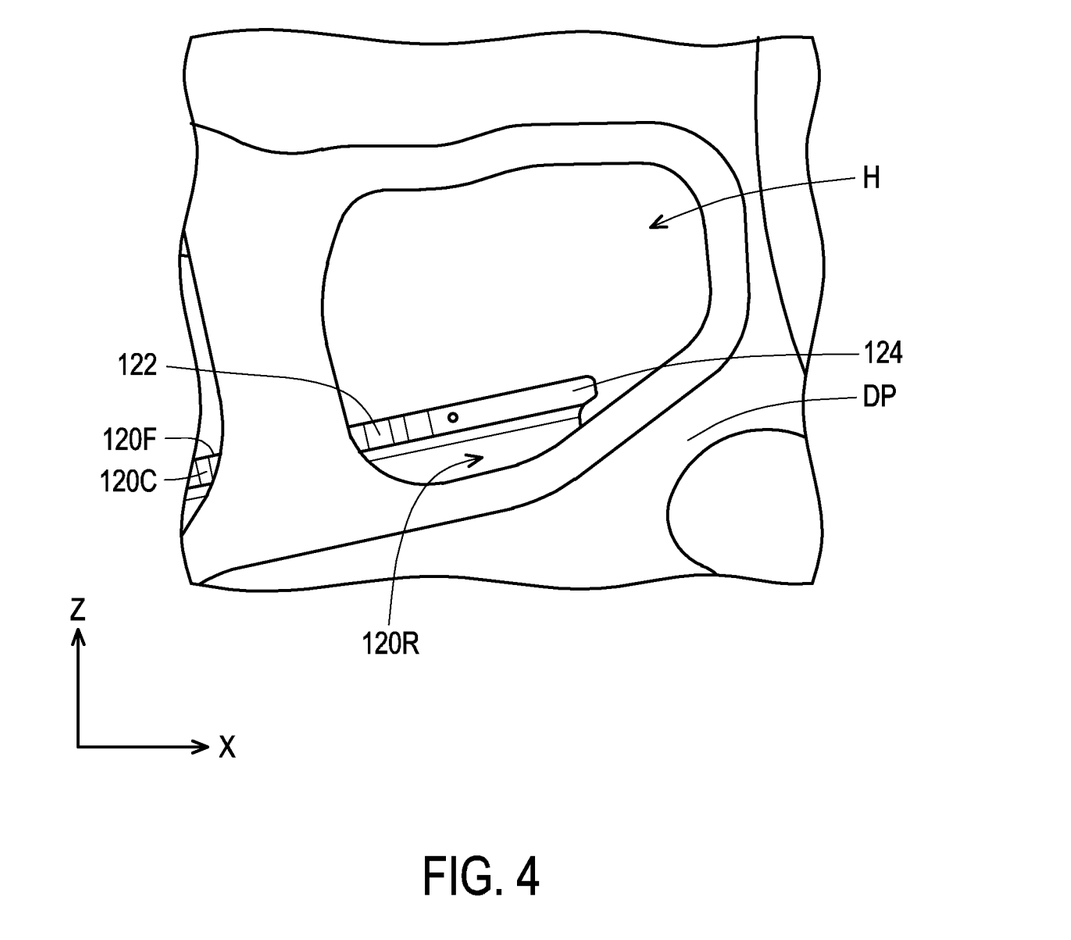
FIG. 4 is a schematic view of the vehicle door beam of FIG. 2 viewed from a different perspective.

FIG. 3 schematically shows a vehicle door beam of FIG. 1 according to an embodiment of the disclosure. For ease of description, FIG. 3 shows the members before being assembled. FIG. 4 is a schematic view of the vehicle door beam of FIG. 2 viewed from a different perspective. FIG. 4 is a schematic view of the vehicle door beam viewed from a vehicle inner side.

With reference to FIG. 1 to FIG. 4, a vehicle door beam 100 disposed at a vehicle door D includes a beam body 110 and an inner side member 120. The beam body 110 extends along the front-rear direction of the vehicle. The inner side member 120 is disposed at a vehicle inner side of the beam body 110. The inner side member 120 includes a fixing part 122 and a non-fixing part 124. The fixing part 122 is used to fix the beam body 110. The non-fixing part 124 is disposed not to be fixed to the beam body 110, and the non-fixing part 124 is disposed at a position in front of the fixing part 122 in the front-rear direction. As shown in FIG. 1 to FIG. 3, two ends of the vehicle door beam 100 may be fixed to the vehicle door through members such as a frame in such a manner that the beam body 110 is extended in the front-rear direction.

In addition, the fixing part 122 and the non-fixing part 124 are disposed between the two ends of the beam body 110, and the position where the non-fixing part 124 is disposed is a position in front of the fixing part 122 in the front-rear direction. As a result, as shown in FIG. 2, in the assembled vehicle door beam 100, the fixing part 122 and the beam body 110 are fixed to each other, while the non-fixing part 124 and the beam body 110 are not fixed to each other. In this embodiment, the configuration of the fixing part 122 is not limited to a structure directly joined with the beam body 110 as long as the fixing part 122 and the beam body 110 can be fixed to each other, and the disclosure is not limited thereto. For example, in this embodiment, the inner side member 120 formed with the fixing part 122 and the non-fixing part 124 being joined with an outer side member 130 to be indirectly fixed to the beam body 110 is taken as an example for description.

In this way, by providing the vehicle door beam 100 with the fixing part 122 and the non-fixing part 124, and disposing the non-fixing part 124 at a position in front of the fixing part 122, the non-fixing part 124 corresponds to the position of the knee of the passenger. In other words, the non-fixing part 124 is overlapped with the knee of the sitting passenger in the vehicle width direction.

Figure 5:
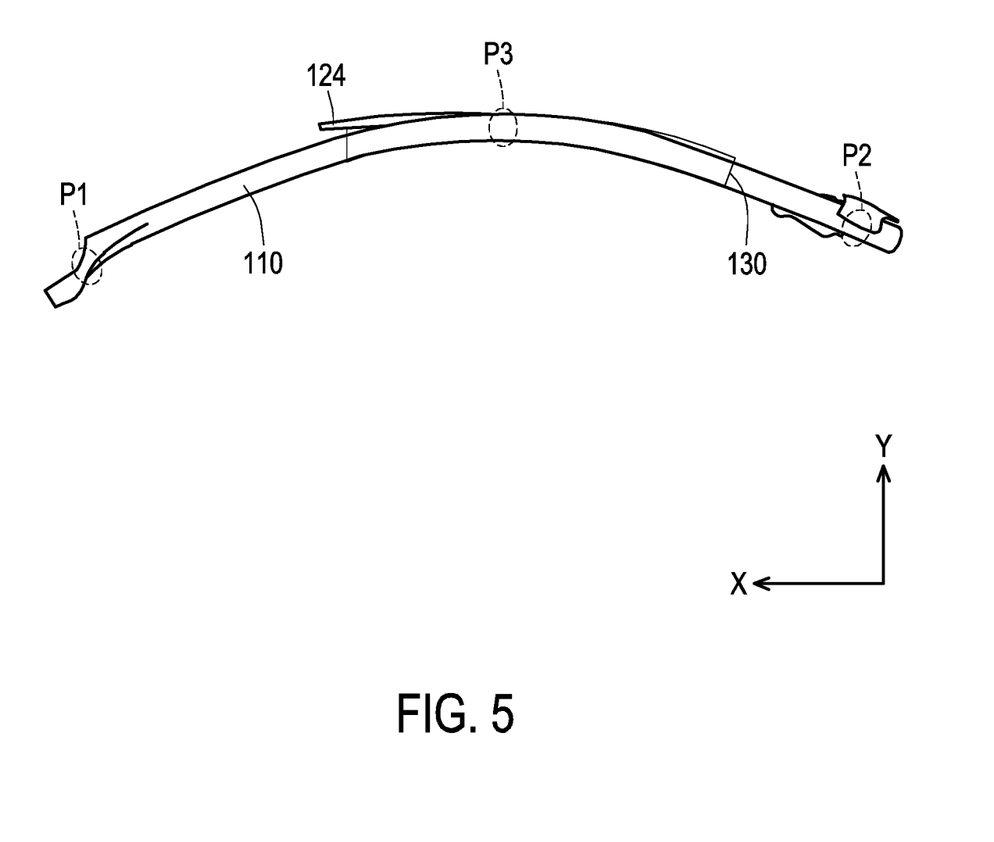
FIG. 5 is a schematic view illustrating a deformed vehicle door beam viewed from above when the vehicle door beam deforms under an impact force.

FIG. 5 is a schematic view illustrating a deformed vehicle door beam viewed from above when the vehicle door beam deforms under an impact force. With reference to FIG. 5, under an impact force, the vehicle door beam 100 may deform due to withstanding the impact force from the side, and the deformed vehicle door beam 100 may be displaced. For example, as shown in FIG. 5, the beam body 110 includes a front side intersection point P1 intersecting a front pillar of the vehicle in the vehicle width direction and a rear side intersection point P2 intersecting a center pillar of the vehicle in the vehicle width direction. The non-fixing part 124 is disposed at a position in front of a middle position P3 between the front side intersection point P1 and the rear side intersection point P2. The fixing part 122 is disposed in rear of the middle position P3. When the vehicle door beam 100 that deforms under an impact force is viewed from above, the position of the maximum displacement generated in the vehicle door beam 100 is referred to as the inflection point. The position of the inflection point is typically located at the middle position P3 substantially in the middle of the two ends (the front side intersection point P1 and the rear side intersection point P2) of the beam body 100. By disposing the non-fixing part 124 at a position in front of the middle position P3, the non-fixing part 124 can relatively reliably push the knee of the passenger toward the vehicle inner side.

In other words, as shown in FIG. 5, when deformation is generated under an impact force, the position of the maximum displacement generated in the vehicle door beam 100 may also be referred to as an innermost point. The position of the innermost point is located at the middle position P3 substantially in the middle of the two ends (the front side intersection point P1 and the rear side intersection point P2) of the beam body 100. The beam body 110 includes an innermost point located at an innermost side in the vehicle width direction when side protrusion occurs due to deformation. The non-fixing part 124 is disposed at a position in front of the innermost point. The fixing part 122 is disposed in rear of the innermost point. By disposing the non-fixing part 124 at a position in front of the innermost point located at the innermost side in the vehicle width direction when side protrusion occurs due to deformation, the non-fixing part 124 can relatively reliably push the knee of the passenger toward the vehicle inner side.

When the vehicle door beam 100 deforms under side impact, the non-fixing part 124 may be displaced in such a manner that the non-fixing part 124 moves away from the beam body 110 toward the vehicle inner side as the fixing part 122 deforms along the beam body 110. Accordingly, impact on the thigh of the passenger can be alleviated to prevent damage to lower limbs of the passenger in the vehicle, improving safety.

As shown in FIG. 1 to FIG. 3, the non-fixing part 124 is disposed to be continuous with the fixing part 122. For example, the inner side member 120 is formed of the same plate to form the non-fixing part 124 and the fixing part 122 that are continuous. In this way, by disposing the non-fixing part 124 to be continuous with the fixing part 122, the fixing part 122 and the beam body 110 may be regarded as one piece for being fixed to each other. With reference to FIG. 5, when the vehicle deforms under an impact force from the side, the fixing part 122 consistently follows and deforms with the beam body 110. At this time, the non-fixing part 124 formed continuously with the fixing part 122 can be reliably separated from the beam body 110 and displaced toward the vehicle inner side.

In addition, in this embodiment, as shown in FIG. 3 and FIG. 4, the vehicle door D includes a vehicle door inner panel (DP) located at the vehicle inner side of the beam body 110. The vehicle door inner panel DP is formed with an opening part H. The non-fixing part 124 is disposed at a position overlapped with the opening part H when viewed in the vehicle width direction.

In this way, by overlapping the position where the non-fixing part 124 is disposed with the opening part H of the vehicle door inner panel DP, when the vehicle door beam 100 deforms under impact, the non-fixing part 124 can relatively reliably push the knee of the passenger toward the vehicle inner side. Since the vehicle inner side of the vehicle door inner panel DP is typically provided with a door trim panel, instead of being in direct contact with the knee of the passenger, the non-fixing part 124 pushes the knee of the passenger through the door trim panel.

In addition, as shown in FIG. 3 and FIG. 4, the vehicle door beam 100 further includes an outer side member 130 disposed at a vehicle outer side of the beam body 110. The beam body 100 is located between the inner side member 120 and the outer side member 130 in the width direction of the vehicle. The inner side member 120 is provided with a joining surface 120C extending along the front-rear direction and joined with the outer side member 130, and the non-fixing part 124 is disposed to be continuous with the joining surface 120C. In the case where the vehicle door beam 100 is disposed at the vehicle door D as shown in FIG. 2, a portion of the beam body 110 is accommodated between the outer side member 130 and the inner side member 120. When viewed from the vehicle width direction, for the fixed portion and the non-fixed portion of the beam body 110, the inner side member 120 and the outer side member 130 are fixed to each other on an upper side and a lower side of the beam body 110 in the up-down direction. The fixed portion forms the fixing part 122, and the non-fixed portion (the front end of the inner side member 120) forms the non-fixing part 124. It can be seen that the non-fixing part 124 is located in front of the fixing part 122.

By disposing the joining surface 120C joined with the outer side member 130 at the inner side member 120 with the non-fixing part 124 being continuous with the joining surface 120C, when the vehicle deforms under an impact force, the non-fixing part 124 can be reliably separated relative to the beam body 110 and displaced toward the vehicle inner side.

Furthermore, in this embodiment, as shown in FIG. 3, the inner side member 120 is formed with a recess part 120R accommodating a portion of the beam body 110 and a flange part 120F disposed on at least one of an upper side and a lower side of the recess part 120R. The joining surface 120C and the non-fixing part 124 are disposed at the flange part 120F. In this embodiment, disposing the flange part 120F on the upper side and the lower side of the recess part 120R is taken as an example.

In this way, by disposing the joining surface 120C and the non-fixing part 124 at the same flange part 120F (for example, the non-fixing part 124 and the joining surface 120C are disposed at the flange part 120F located on the upper side of the recess part 120R as shown in FIG. 1 to FIG. 3), as shown in FIG. 5, when the vehicle door beam 100 deforms under an impact force, the non-fixing part 124 can be reliably separated relative to the beam body 110 and displaced toward the vehicle inner side.

Besides, in this embodiment, as shown in FIG. 3, the non-fixing part 124 is disposed to extend across the flange part 120F and the recess part 120R. By disposing the non-fixing part 124 to extend across the flange part 120F and the recess part 120R so that each of the joining surface 120C and the non-fixing part 124 are continuous with the recess part 120R, rigidity of the non-fixing part 124 can be improved. As a result, when the non-fixing part 124 relatively reliably pushes the corresponding specific part (e.g., the knee or the like) of the passenger toward the vehicle inner side under impact, deformation of the non-fixing part 124 can be suppressed.

Based on the foregoing, in the vehicle door beam of the disclosure, since the non-fixing part is disposed at a position of the vehicle door beam corresponding to the knee of the passenger, when the vehicle door beam deforms under side impact, the non-fixing part may be displaced in such a manner that the non-fixing part moves away from the beam body toward the vehicle inner side as the fixing part deforms along the beam body. Since the non-fixing part is disposed at a position of the vehicle door beam corresponding to the knee of the passenger in the vehicle, the non-fixing part pushes, for example, the knee of the passenger (spaced by a door trim panel or the like in between) toward the vehicle inner side. Accordingly, impact on the thigh can be alleviated to prevent damage to lower limbs of the passenger in the vehicle, improving safety.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vehicle door beam disposed at a vehicle door of a vehicle, the vehicle door beam comprising:
   a beam body extending along a front-rear direction of the vehicle; and
   an inner side member disposed at a vehicle inner side of the beam body, the inner side member comprising:
      a fixing part fixed to the beam body; and
      a non-fixing part not fixed to the beam body and being disposed at a position in front of the fixing part in the front-rear direction,
   wherein the inner side member is formed with a flange part disposed on at least one of an upper side and a lower side of the beam body, and the non-fixing part is disposed at the flange part,
   wherein the non-fixing part is disposed to be continuous with the fixing part,
   wherein the vehicle door beam further comprises:
      an outer side member disposed at a vehicle outer side of the beam body, wherein the beam body is located between the inner side member and the outer side member in a width direction of the vehicle,
   wherein the inner side member is provided with a joining surface extending along the front-rear direction and joined with the outer side member, and the non-fixing part is disposed to be continuous with the joining surface.

2. The vehicle door beam according to claim 1, wherein the inner side member is formed with:
   a recess part accommodating a portion of the beam body; and
   wherein the flange part is disposed on at least one of an upper side and a lower side of the recess part,
   wherein the joining surface is disposed at the flange part.

3. The vehicle door beam according to claim 2, wherein the non-fixing part is disposed to extend across the flange part and the recess part.

4. The vehicle door beam according to claim 1, wherein the vehicle door comprises:
   a vehicle door inner panel located at the vehicle inner side of the beam body, the vehicle door inner panel being formed with an opening part,
   wherein the non-fixing part is disposed at a position overlapped with the opening part when viewed in a vehicle width direction.

5. The vehicle door beam according to claim 1, wherein the beam body comprises:
   a front side intersection point intersecting a front pillar of the vehicle in a vehicle width direction; and
   a rear side intersection point intersecting a center pillar of the vehicle in the vehicle width direction,
   wherein the non-fixing part is disposed at a position in front of a middle position between the front side intersection point and the rear side intersection point.

6. The vehicle door beam according to claim 1, wherein the beam body comprises:
   an innermost point located at an innermost side in a vehicle width direction when side protrusion occurs due to deformation, wherein the non-fixing part is disposed at a position in front of the innermost point.

7. The vehicle door beam according to claim 2, wherein the vehicle door comprises:
   a vehicle door inner panel located at the vehicle inner side of the beam body, the vehicle door inner panel being formed with an opening part,
   wherein the non-fixing part is disposed at a position overlapped with the opening part when viewed in a vehicle width direction.

8. The vehicle door beam according to claim 2, wherein the beam body comprises:
   a front side intersection point intersecting a front pillar of the vehicle in a vehicle width direction; and
   a rear side intersection point intersecting a center pillar of the vehicle in the vehicle width direction,
   wherein the non-fixing part is disposed at a position in front of a middle position between the front side intersection point and the rear side intersection point.

9. The vehicle door beam according to claim 2, wherein the beam body comprises:
   an innermost point located at an innermost side in a vehicle width direction when side protrusion occurs due to deformation, wherein the non-fixing part is disposed at a position in front of the innermost point.

10. The vehicle door beam according to claim 3, wherein the vehicle door comprises:
a vehicle door inner panel located at the vehicle inner side of the beam body, the vehicle door inner panel being formed with an opening part,
wherein the non-fixing part is disposed at a position overlapped with the opening part when viewed in a vehicle width direction.

11. The vehicle door beam according to claim 3, wherein the beam body comprises:
a front side intersection point intersecting a front pillar of the vehicle in a vehicle width direction; and
a rear side intersection point intersecting a center pillar of the vehicle in the vehicle width direction,
wherein the non-fixing part is disposed at a position in front of a middle position between the front side intersection point and the rear side intersection point.

12. The vehicle door beam according to claim 3, wherein the beam body comprises:
an innermost point located at an innermost side in a vehicle width direction when side protrusion occurs due to deformation, wherein the non-fixing part is disposed at a position in front of the innermost point.

13. A vehicle door beam disposed at a vehicle door of a vehicle, the vehicle door beam comprising:
a beam body extending along a front-rear direction of the vehicle; and
an inner side member disposed at a vehicle inner side of the beam body, the inner side member comprising:
a fixing part fixed to the beam body; and
a non-fixing part not fixed to the beam body and being disposed at a position in front of the fixing part in the front-rear direction,
wherein the inner side member is formed with a flange part disposed on at least one of an upper side and a lower side of the beam body, and the non-fixing part is disposed at the flange part,
wherein the beam body comprises:
a front side intersection point intersecting a front pillar of the vehicle in a vehicle width direction; and
a rear side intersection point intersecting a center pillar of the vehicle in the vehicle width direction,
wherein the non-fixing part is disposed at a position in front of a middle position between the front side intersection point and the rear side intersection point.

* * * * *